Oct. 26, 1926.                                            1,604,498
             J. B. STRAUSS
   ROTATING CONNECTION FOR BASCULE BRIDGES
        Filed Dec. 10, 1921      2 Sheets-Sheet 1
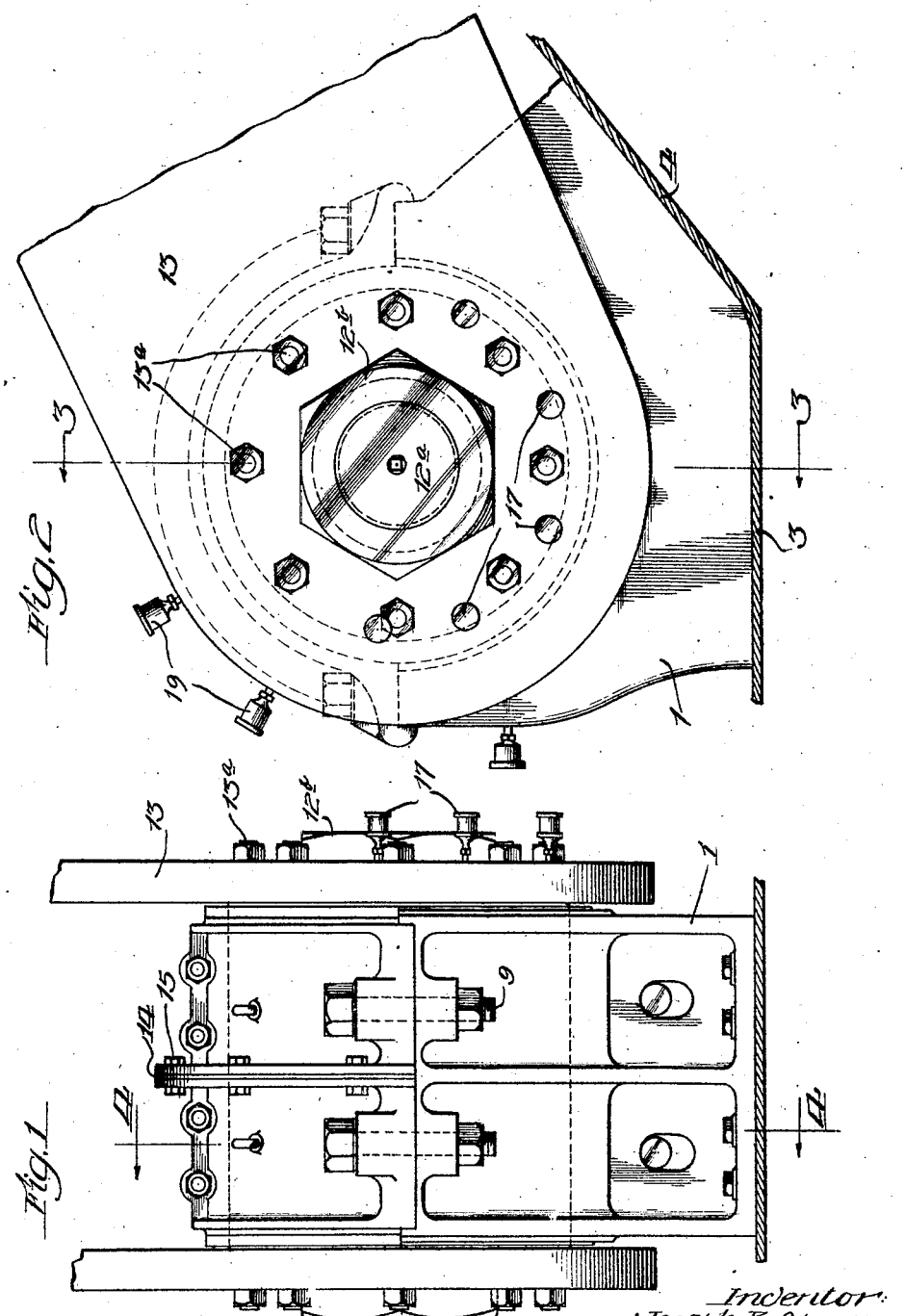

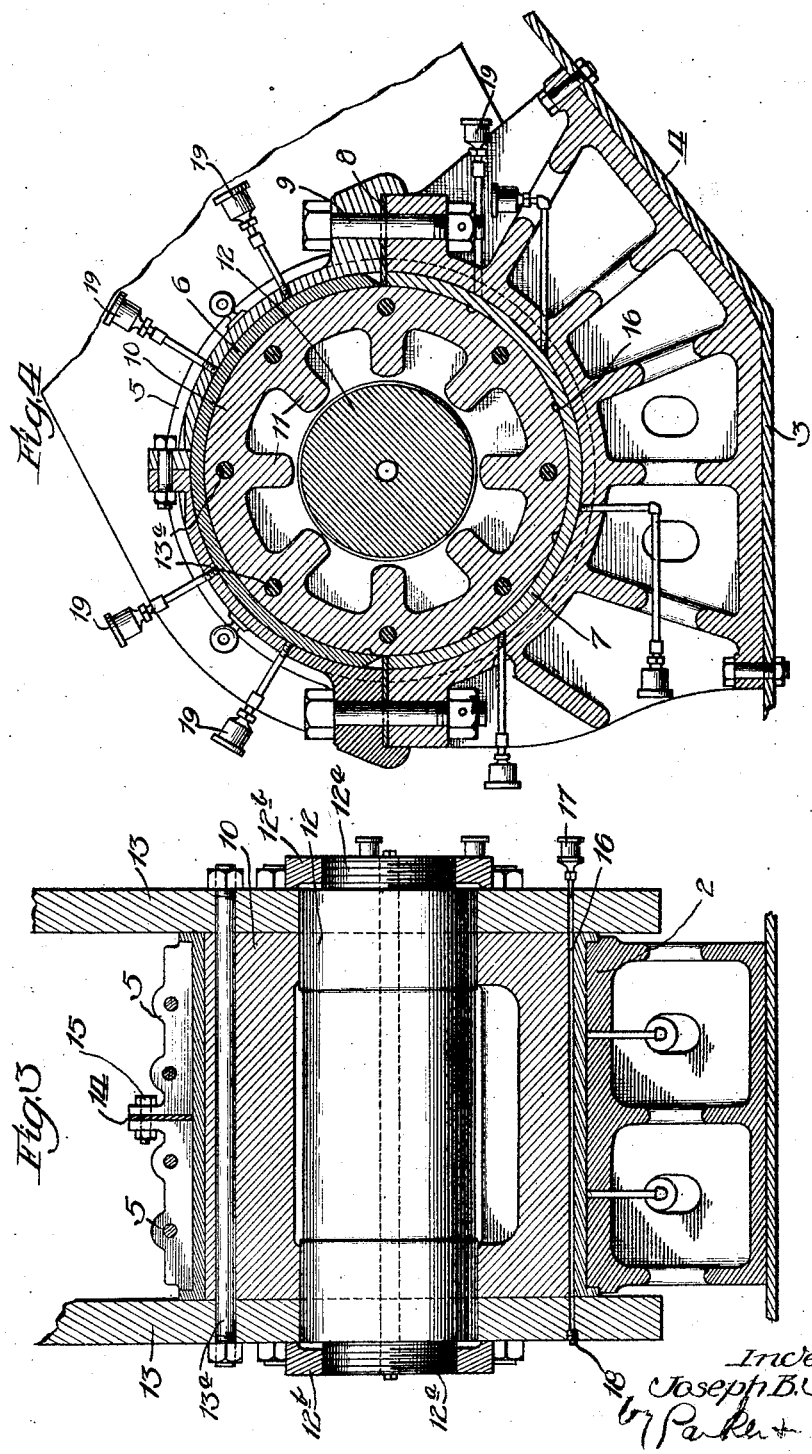

Patented Oct. 26, 1926.

1,604,498

UNITED STATES PATENT OFFICE.

JOSEPH B. STRAUSS, OF CHICAGO, ILLINOIS.

ROTATING CONNECTION FOR BASCULE BRIDGES.

Application filed December 10, 1921. Serial No. 521,306.

This invention relates to rotating connections for bascule bridges, and has for its object to provide a new and improved device of this description.

Bascule bridges as now constructed are very heavy, and one of the problems is to provide suitable rotating connections for them which will be strong and durable, and have a sufficient surface area for the trunnions, and at the same time be of low cost and high efficiency. The invention has among other objects to provide such a rotating connection. Referring now to the drawings—

Fig. 1 is a rear elevation of one form of rotating connection embodying the invention;

Fig. 2 is a side elevation of the device illustrated in Fig. 1;

Fig. 3 is a sectional view taken on line 3—3 of Fig. 2;

Fig. 4 is a sectional view taken on line 4—4 of Fig. 1;

Like numerals refer to like parts throughout the several figures.

Referring now to the drawings wherein I have shown one of the rotating connections, I provide a box or trunnion support 1, which is mounted upon a fixed support, such as the pier. This box or support has a plurality of pressure bases 3 and 4 at an angle to each other (see Figs. 2 and 4) so as to properly take care of the pressures. The box 2 is provided with a cover 5 which as herein shown is divided into a plurality of pieces, preferably both circumferentially and logitudinally. Located within the box is a bushing, consisting of two sections, an upper section 6, and a lower section 7. The section 7 is of some material which will stand great pressure, such as bronze, while the upper section may be made of softer material, such as babbitt. Some means is provided for preventing these sections of the bushing from rotating. As herein shown I provide one or more stop devices 8 which may be simply loose pieces or plates, the ends of which project between the two sections of the bushing as shown in Fig. 4, these stop devices being clamped between the cover and the other portion of the box by means of the bolts 9 (see Fig. 4). These plates may have holes in them for these bolts if desired.

Mounted in the box or support is a comparatively large cylindrical part or trunnion 10, which gives a large bearing area, and which may be made of a low cost construction, such as cast steel or the like. This cylindrical part is hollow and is preferably provided with internal projections 11, which project into the hollow thereof. This reduces the weight and the cost and still maintains the strength.

Located in the hollow of the part 10 is a pin 12 which is comparatively small in diameter and which is made of very strong material such as forge steel, and which engages the projections 11. The pin 12 has projecting ends which project beyond the part 10 and which engage the main truss of the bridge so as to support it. As herein shown there are members 13 connected with the main truss between which the cylindrical part 10 is received, the projecting ends of the pin 12 being connected with the members 13 (see Fig. 3). Any suitable connection may be used. As shown in Fig. 3 the pins are provided with threaded parts $12^a$ which project beyond the members 13, and which are engaged by holding nuts $12^b$. The pin 12 and the cylindrical part 10 are fixed with relation to the main truss, and this in the present construction is secured by means of bolts $13^a$ which pass through the members 13 and through the cylindrical part 10.

I prefer to place between the sections of the cover produced by the circumferential division, a plate 14 (see Fig. 3), which holds the parts thereof in the position shown in Fig. 3 when the bolts 15 are tightened. This is for the purpose of facilitating the removal of the cover. When it is desired to recover the cover, the bolts 15 are removed and the plate 14 is also removed, and this permits the two sections to be moved towards each other so as to free their outer edges and permit them to be easily removed. I also prefer to provide straight oil grooves 16 on the outer surface of the cylindrical part 10 for the lubricant. The lubricant may be supplied in any suitable way, and for purposes of illustration I have shown an oil cup 17 connected by a tube with each of these grooves at one end, while the other end is stopped by a plug 18.

When it is desired to clean out these grooves, the plug and grease cup can be removed, and a cleaner, such as a wire, pushed through the groove to remove any clogging material therein. I may also provide a series of radially disposed grease cups 19 (see Fig. 4).

This device produces a large bearing with a small support with the lubricated surface in the plane of the main truss. The bearing is made of two kinds of metal, the large cylindrical part with the bearing surface being made of a cheaper metal, while the small part taking the bending moment being made of more expensive and stronger metal.

It will be seen that by means of this construction I provide a strong, durable, inexpensive, efficient rotating connection for bascule bridges.

I claim:

1. A rotating connection for bascule bridges comprising a hollow cylindrical metal bearing part, surrounding receiving members for said cylindrical part in which said hollow cylindrical part is rotatably mounted, a pin in said hollow cylindrical part and having the ends projecting therefrom, and a connection between the ends of said pin and the main span of the bridge.

2. A rotating connection for bascule bridges comprising a hollow cylindrical metal bearing part, a support therefor, a pin in said hollow cylindrical part in which said hollow cylindrical part is rotatably mounted and having ends which project beyond the hollow cylindrical part, said ends adapted to be connected with the moving span of the bridge.

3. A rotating connection for bascule bridges comprising a hollow cylindrical metal part with a fixed part in which it is mounted, a pin in said hollow cylindrical part and longer than said cylindrical part, the ends of said pin projecting beyond said cylindrical part, two members connected with the moving span and between which said cylindrical part and said fixed part are received, and a connection between said members and the projecting ends of said pin.

4. A rotating connection for bascule bridges comprising a small fixed pin to take the bending moment, and a larger exterior cylindrical metal part surrounding said pin to reduce frictional resistance, the ends of said pin projecting beyond said cylindrical part, said ends adapted to be connected with the moving span of the bridge.

5. A rotating connection for bascule bridges comprising a small fixed pin of forge metal to take the bending moment, and a larger exterior cylindrical part of cast metal surrounding said pin and having an exterior bearing surface, the ends of said pin projecting beyond said cylindrical part, said ends adapted to be connected with the moving span of the bridge.

6. A rotating connection for bascule bridges comprising a non-rotating receiving part, a hollow cylindrical part having an exterior bearing face and mounted in said receiving part, said hollow part having radial projections extending part way across the hollow thereof, a pin in said hollow part engaging said projections, the ends of the pin projecting beyond the hollow part, said ends adapted to be connected with the moving span of the bridge.

7. A rotating connection for bascule bridges comprising a hollow cylindrical part having radial projections projecting partway into the hollow thereof, a pin in the hollow of said cylindrical part surrounded by said projections, the ends of the pin projecting beyond the hollow cylindrical part, said ends adapted to be connected with the moving span of the bridge.

Signed at Chicago, county of Cook and State of Illinois, this 6th day of December, 1921.

JOSEPH B. STRAUSS.